(12) United States Patent
Glime, III et al.

(10) Patent No.: US 12,442,462 B2
(45) Date of Patent: Oct. 14, 2025

(54) DIAPHRAGM VALVE WITH ACTUATOR BEARING ELEMENT

(71) Applicant: Swagelok Company, Solon, OH (US)

(72) Inventors: William H. Glime, III, Chagrin Falls, OH (US); Branden W. Keeper, Mentor, OH (US); Timothy P. Vidoni, Cleveland, OH (US); Daniel E. Zeiler, Chardon, OH (US)

(73) Assignee: SWAGELOK COMPANY, Solon, OH (US)

( * ) Notice: Subject to any disclaimer, the term of this patent is extended or adjusted under 35 U.S.C. 154(b) by 0 days.

(21) Appl. No.: 18/409,850

(22) Filed: Jan. 11, 2024

(65) Prior Publication Data

US 2024/0240726 A1 Jul. 18, 2024

Related U.S. Application Data

(60) Provisional application No. 63/438,802, filed on Jan. 13, 2023.

(51) Int. Cl.
*F16K 27/02* (2006.01)
*F16K 7/17* (2006.01)

(52) U.S. Cl.
CPC .......... *F16K 27/0281* (2013.01); *F16K 7/17* (2013.01)

(58) Field of Classification Search
CPC ... F16K 7/00; F16K 7/12; F16K 7/123; F16K 7/126; F16K 7/14; F16K 7/16; F16K 7/17; F16K 7/20
See application file for complete search history.

(56) References Cited

U.S. PATENT DOCUMENTS

| 3,367,359 A | 2/1968 | Johnson |
| 3,508,573 A | 4/1970 | Smith |

(Continued)

FOREIGN PATENT DOCUMENTS

| CN | 2069950 U | 1/1991 |
| CN | 2086351 U | 10/1991 |

(Continued)

OTHER PUBLICATIONS

International Search Report from PCT/US2024/011132 dated May 14, 2024.

*Primary Examiner* — Daphne M Barry
(74) *Attorney, Agent, or Firm* — Calfee, Halter & Griswold LLP (57) ABSTRACT

A diaphragm valve includes a valve body with a valve seat disposed in a valve cavity surrounding a flow passage, a diaphragm movable between a closed position in sealing engagement with the valve seat and an open position axially spaced apart from the valve seat, and an actuator including an actuator housing assembled with the valve body and an actuating arrangement axially movable within the actuator housing between a first position holding the diaphragm in the closed position and a second position permitting movement of the diaphragm from the closed position to the open position. The actuating arrangement includes an actuator stem extending through a lower bore in the actuator housing, an actuator button disposed between a lower end of the actuator stem and the diaphragm for contact with the diaphragm, and a bearing member disposed between the actuator stem and the actuator button.

26 Claims, 8 Drawing Sheets

(56) References Cited

U.S. PATENT DOCUMENTS

| | | |
|---|---|---|
| 5,538,332 A | 7/1996 | Carroll |
| 5,899,437 A | 5/1999 | Quarre |
| 7,347,408 B2 | 3/2008 | Keiser |
| 7,887,024 B2 | 2/2011 | Timko et al. |
| 8,434,793 B2 * | 5/2013 | Glime .................. C09D 183/16 285/382.7 |
| 8,702,056 B2 | 4/2014 | Crochet, Sr. et al. |
| 9,797,520 B2 * | 10/2017 | Ohtsuki ............... G05D 7/0635 |
| 9,863,542 B2 | 1/2018 | Glime, III |
| 10,260,646 B2 | 4/2019 | Dennis et al. |
| 10,619,744 B2 * | 4/2020 | Glime, III ................ F16K 1/12 |
| 11,173,546 B2 * | 11/2021 | Swartz ................... B22F 10/66 |
| 11,873,915 B1 * | 1/2024 | Addona .................. F16K 1/48 |
| 2005/0145812 A1 * | 7/2005 | Kumar ................... F16K 31/10 251/129.15 |
| 2006/0237064 A1 | 10/2006 | Benson |
| 2008/0105845 A1 | 5/2008 | Yeary |
| 2010/0013587 A1 | 1/2010 | Yan |
| 2011/0140014 A1 | 6/2011 | Schmit |
| 2018/0031133 A1 | 2/2018 | Glime, III |

FOREIGN PATENT DOCUMENTS

| | | |
|---|---|---|
| CN | 102278492 A | 12/2011 |
| CN | 103244701 A | 8/2013 |
| CN | 204805605 | 11/2015 |
| CN | 207648188 | 7/2018 |
| CN | 106090288 | 3/2019 |
| JP | H06235466 A | 8/1994 |
| JP | H08210551 A | 8/1996 |
| JP | H10318385 A | 12/1998 |
| JP | 2016133207 | 7/2016 |
| JP | 2020197233 | 12/2020 |
| RU | 2676583 C1 | 1/2019 |
| WO | 1997/009550 | 3/1997 |
| WO | 2012/049694 | 4/2012 |
| WO | 2015/002855 A1 | 1/2015 |

* cited by examiner

DIAPHRAGM VALVE WITH ACTUATOR BEARING ELEMENT

CROSS-REFERENCE TO RELATED APPLICATION

This application claims priority to and all benefit of U.S. Provisional Patent Application Ser. No. 63/438,802, filed on Jan. 13, 2023, for DIAPHRAGM VALVE WITH ACTUATOR BEARING ELEMENT, the entire disclosure of which is incorporated herein by reference.

BACKGROUND

Valves are commonly used to control fluid flow. Diaphragm valves are an example of a flow control valve that are used in man industries to control the flow of gas, liquid and other fluids, operating to close off flow by moving a diaphragm into contact with a valve seat, and to allow flow by permitting separation of the diaphragm from the valve seat. In many embodiments, the valve includes an actuator (e.g., manually operated, pneumatically operated, electrically operated, etc.) having an actuator stem that is axially movable toward the diaphragm to hold the diaphragm in the closed position, and away from the diaphragm to permit movement (e.g., by elastic/spring biased movement, or under fluid pressure) of the diaphragm to the open position.

SUMMARY

In an exemplary embodiment of the present disclosure, a diaphragm valve includes a valve body with a valve seat disposed in a valve cavity surrounding a flow passage, a diaphragm movable between a closed position in sealing engagement with the valve seat and an open position axially spaced apart from the valve seat, and an actuator including an actuator housing assembled with the valve body and an actuating arrangement axially movable within the actuator housing between a first position holding the diaphragm in the closed position and a second position permitting movement of the diaphragm from the closed position to the open position. The actuating arrangement includes an actuator stem extending through a lower bore in the actuator housing, an actuator button disposed between a lower end of the actuator stem and the diaphragm for contact with the diaphragm, and a bearing member disposed between the actuator stem and the actuator button.

BRIEF DESCRIPTION OF THE DRAWINGS

Further advantages and benefits will become apparent to those skilled in the art after considering the following description and appended claims in conjunction with the accompanying drawings, in which:

DETAILED DESCRIPTION OF EXEMPLARY EMBODIMENTS

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include the specified value, values within 5% of the specified value, and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

In the present disclosure, the terms "upper" and "lower" are used to identify relative positions of elements of the described components of the assembly, as oriented in the drawings. It is to be understood that the valve assembly may be mounted or arranged in any suitable orientation.

Diaphragm valves are commonly actuated to a closed position by applying a force from an actuating element to a central, flexible portion of the diaphragm to deflect and hold the diaphragm central portion against a valve seat surrounding a valve flow passage, to block flow from the flow passage. The diaphragm engaging surface of the actuating element may desirably be sized and contoured to maximize sealing contact between the diaphragm and the valve seat. Additionally, positional adjustability of the diaphragm engaging surface on the actuating element may be desirable, for example, to account for small misalignments and/or machining tolerances. To allow for a larger surface contact area and/or and positional adjustability of the diaphragm engaging surface, the actuating element or arrangement may include an actuator stem driven by an actuating mechanism (e.g., fluid driven actuator piston) and a diaphragm engaging actuator button loosely assembled or loosely retained with the actuator stem.

Many diaphragm valve applications, such as atomic layer deposition (ALD) applications, require rapid and continuous cycling between open and closed positions, resulting in millions of actuation cycles in a relatively short period of time. In such applications where loosely assembled actuating components are exposed to rapid, frequent cycling, repeated impacts between the loosely assembled components can result in accelerated wear and heat generation.

According to an exemplary aspect of the present disclosure, a diaphragm valve may be provided with an actuating arrangement or subassembly including a movable actuator stem, a diaphragm engaging actuator button, and a bearing member disposed between the actuator stem and the actuator button. The bearing member may be configured to reduce or eliminate contact between the actuator stem and the actuator button. In some embodiments, the bearing member may be provided in a material selected for reduced wear between the contacting surfaces, for example, by including a material having a greater hardness (e.g., as compared to the materials of the actuator stem and button). In other embodiments, the bearing member may additionally or alternatively be provided in a material selected for reduced thermal conductivity, for example, to provide a thermal break across the actuator components.

Figure 1:
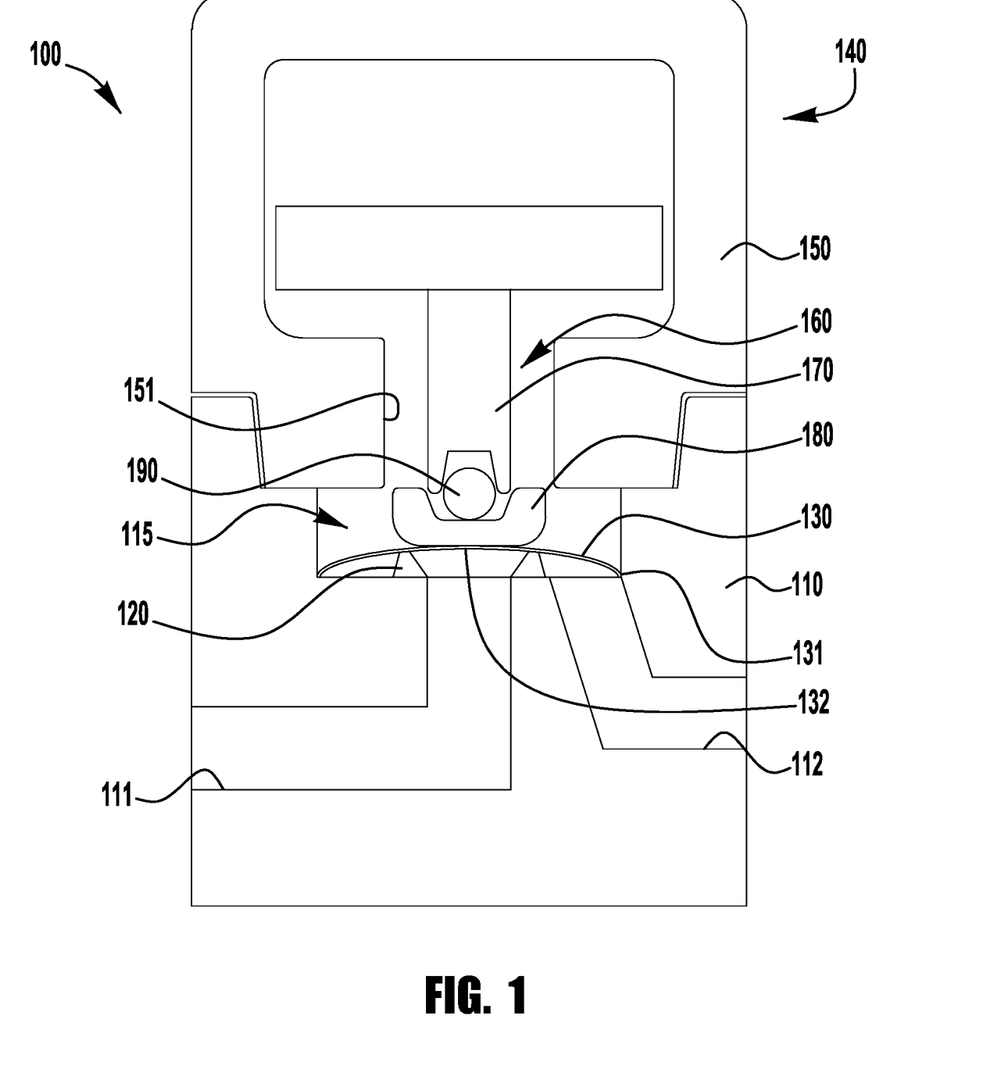
FIG. 1 illustrates a schematic cross-sectional view of an exemplary diaphragm valve assembly, according to an exemplary embodiment of the present disclosure.

FIG. 1 schematically illustrates a cross-sectional view of an exemplary diaphragm valve 100 including a valve body 110 defining first and second flow passages 111, 112 extending to an internal valve cavity 115, with a valve seat 120, integrated with or assembled with the valve body, disposed in the valve cavity and surrounding the first flow passage 111. A diaphragm 130 is retained in the valve cavity 115, with an axially fixed outer perimeter 131 and an axially flexible central portion 132 movable between a closed position in sealing or flow obstructing engagement with the valve seat 120, and an open position axially spaced apart from the valve seat to permit flow through the flow passages 111, 112. An actuator 140 includes an actuator housing 150 assembled with the valve body 110 and an actuating arrangement 160 axially movable within the actuator housing between a first position holding the diaphragm 130 in the closed position and a second position permitting movement of the diaphragm from the closed position to the open position. The exemplary actuating arrangement 160 includes an actuator stem 170 extending through a lower bore 151 in the actuator housing 150, an actuator button 180 disposed between a lower end of the actuator stem and the diaphragm 130 for contact with the central portion 132 of the diaphragm, and a bearing member 190 disposed between the actuator stem and the actuator button.

Many different actuator stem, actuator button, and bearing member configurations may be used. For example, in some embodiments, an upper portion of the bearing member may be received in a lower socket portion of the actuator stem, with a lower portion of the bearing member received in an upper socket portion of the actuator button. In some such embodiments, the lower socket portion of the actuator stem may be received in the upper socket portion of the actuator button. In other such embodiments, the upper socket portion of the actuator button may be received in the lower socket portion of the actuator stem.

In some embodiments, the upper socket portion of the actuator button may include an annular wall. In some such embodiments, the lower bore of the actuator housing and the lower socket portion of the actuator stem define an annular recess receiving the annular wall of the upper socket portion.

In some embodiments, the bearing member may be secured with the lower socket portion of the actuator stem. In some such embodiments, the bearing member may be press fit into the lower socket portion. In other such embodiments, the lower socket portion may be crimped over the bearing member. In still other such embodiments, the bearing member may be snap fit into the lower socket portion.

In some embodiments, the bearing member may be secured with the upper socket portion of the actuator button. In some such embodiments, the bearing member may be press fit into the upper socket portion. In other such embodiments, the upper socket portion may be crimped over the bearing member. In still other such embodiments, the bearing member may be snap fit into the upper socket portion.

In some embodiments, the bearing member may include convex upper and lower portions. In some such embodiments, the bearing member may be spherical. In some such embodiments, the lower socket portion of the actuator stem may include a concave inner face portion providing increased surface contact with the convex upper portion of the bearing member. In some such embodiments, the upper socket portion of the actuator button may include a concave inner face portion providing increased surface contact with the convex lower portion of the bearing member.

In some embodiments, the bearing member may include a material having a greater hardness than a material of the actuator stem and a material of the actuator button.

In some embodiments, the bearing member may include a material having a lower thermal conductivity than a material of the actuator stem and a material of the actuator button.

In some embodiments, the bearing member may include ceramic.

In some embodiments, the actuator stem and actuator button may include metal.

In some embodiments, the actuator button may be manufactured from powdered metal.

In some embodiments, the actuator stem may include a fluid driven piston.

In some embodiments, the actuator button may be loosely retained with the actuator stem and the bearing member by assembly of the valve body with the actuator housing.

In some embodiments, the actuator button may be angularly movable with respect to the actuator stem.

Figure 2:
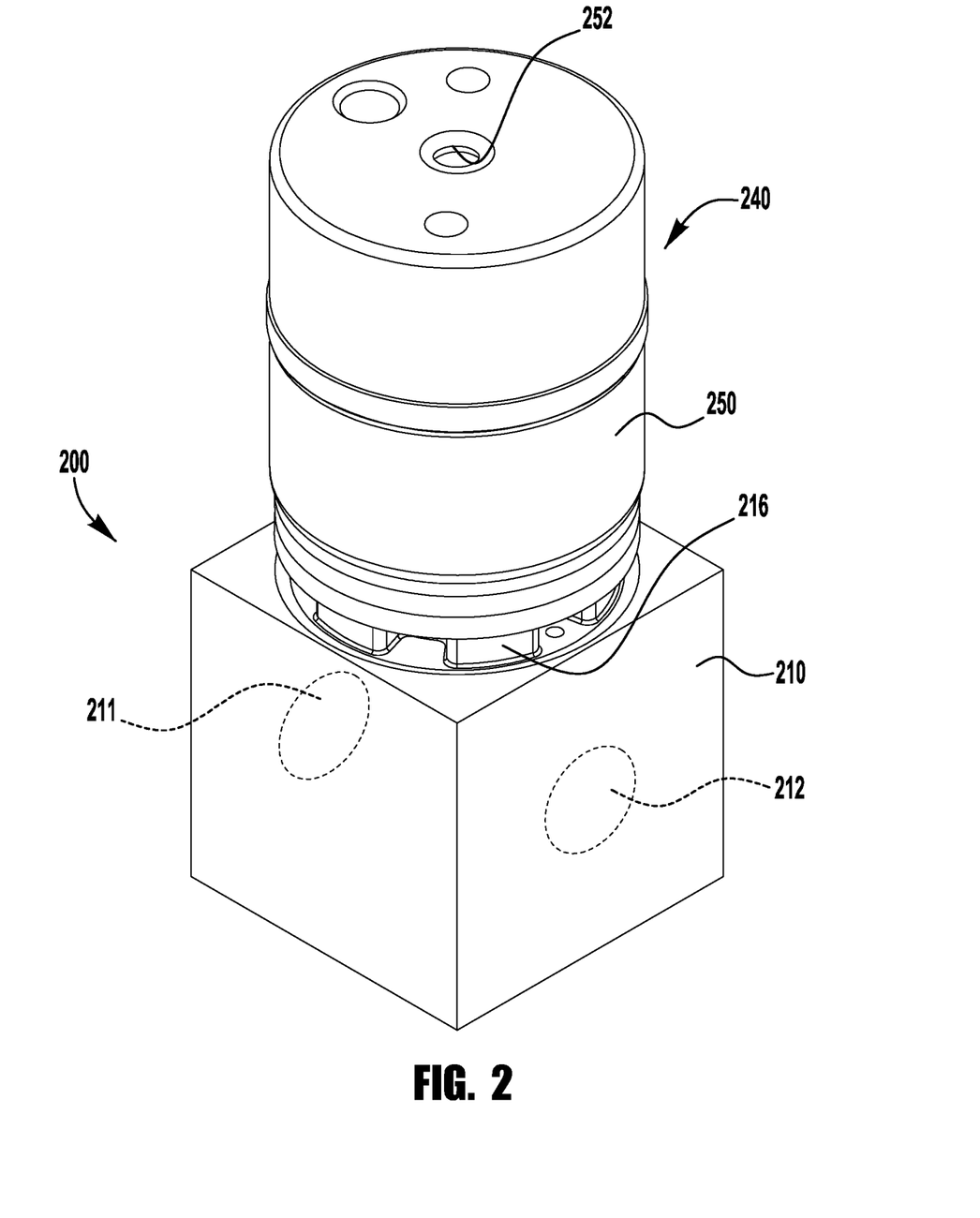
FIG. 2 illustrates a perspective view of another exemplary diaphragm valve assembly, according to another exemplary embodiment of the present disclosure.
Figure 3:
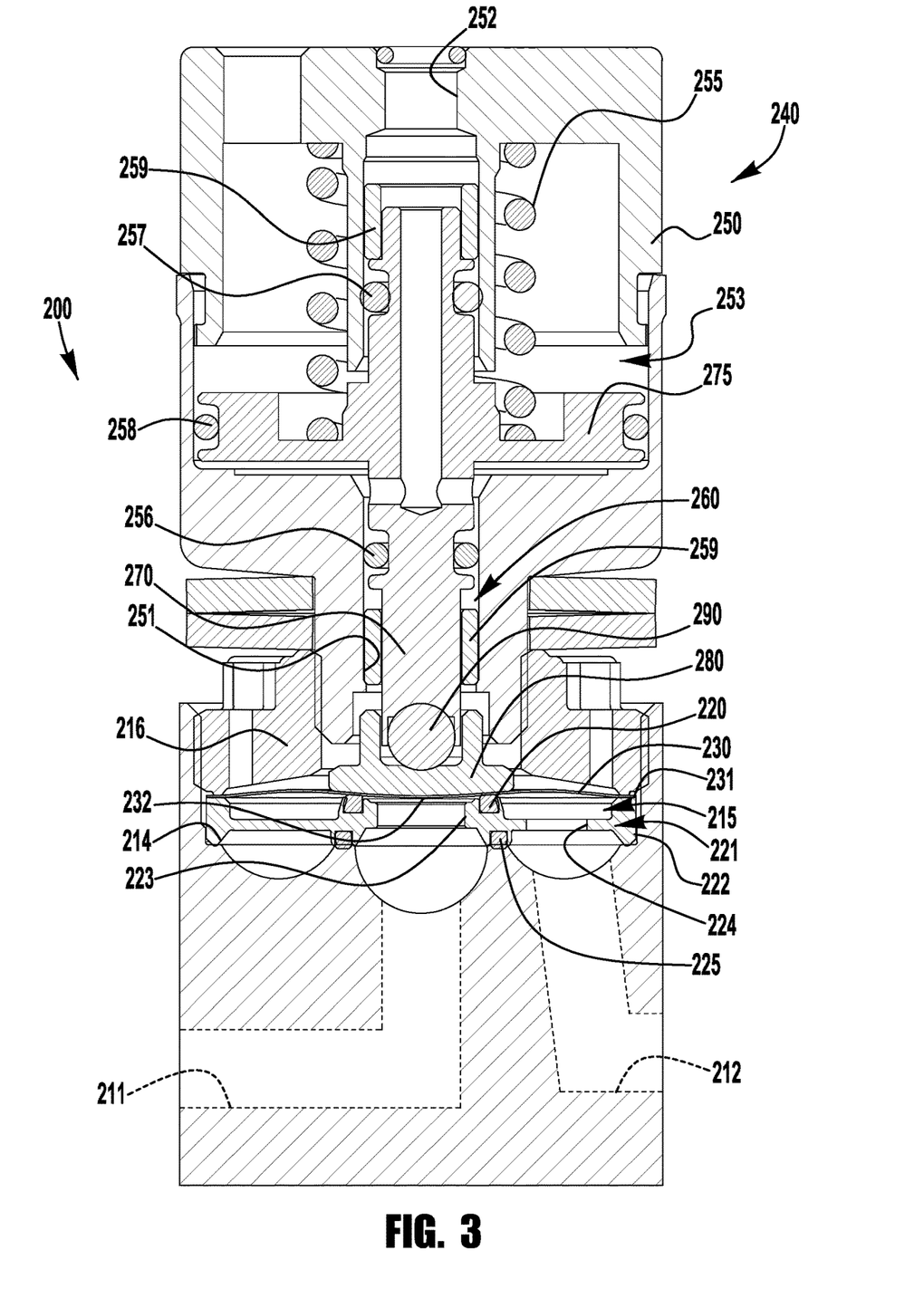
FIG. 3 is a side cross-sectional view of the diaphragm valve assembly of FIG. 2.
Figure 3A:
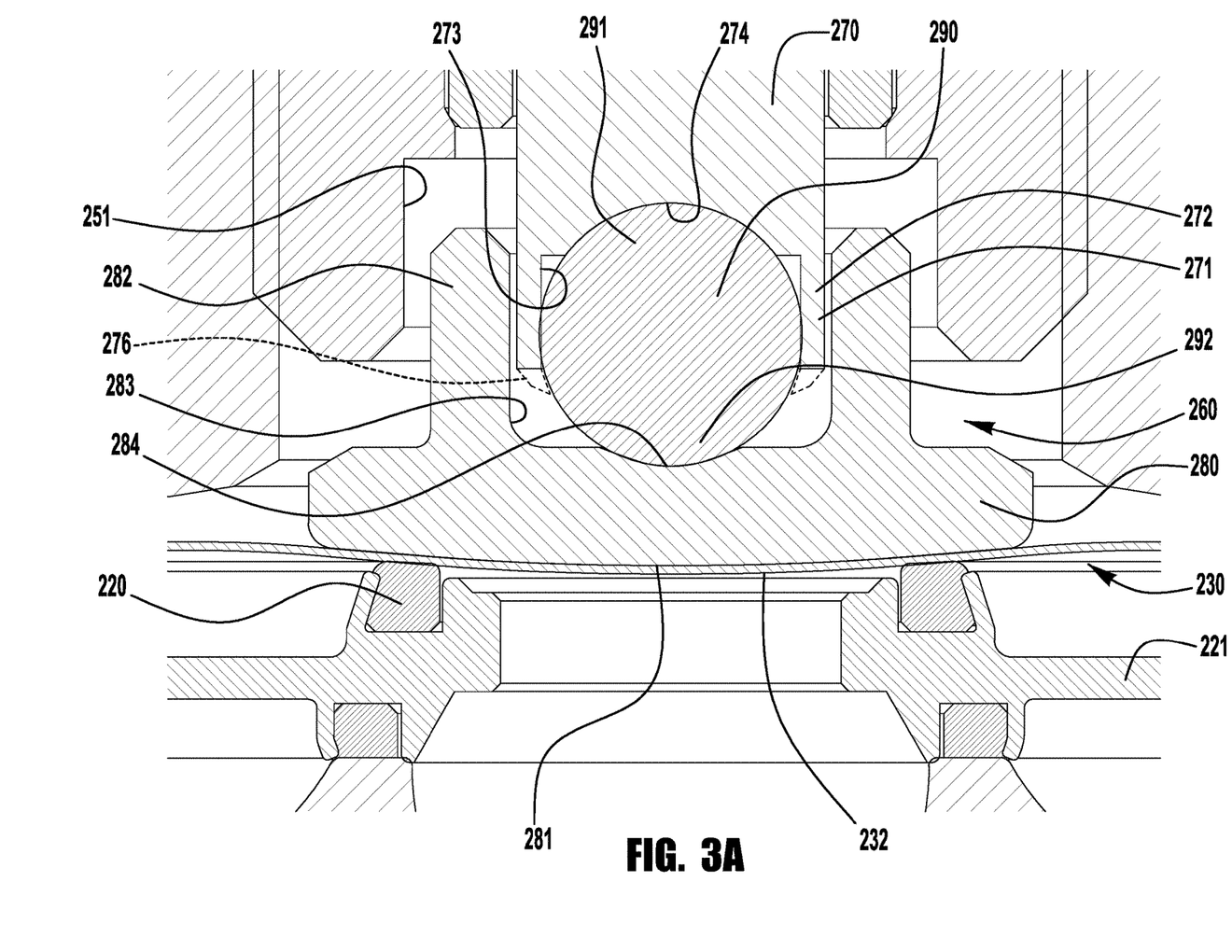
FIG. 3A is an enlarged partial cross-sectional view of an actuating arrangement of the diaphragm valve assembly of FIG. 2.

FIGS. 2, 3, and 3A illustrate an exemplary diaphragm valve assembly 200 including a valve body 210 defining first and second flow passages 211, 212 extending to an internal valve cavity 215, and an actuator 240 assembled with the valve body 210. A diaphragm 230 is retained in the valve cavity 215, with an axially fixed outer perimeter 231 and an axially flexible central portion 232 movable, by operation of the actuator 240, between a closed position in sealing or flow obstructing engagement with the valve seat 220, and an open position axially spaced apart from the valve seat to permit flow through the flow passages 211, 212.

While the valve seat may be integrally formed or integrated with (e.g., staked into) the valve body, the valve seat may be provided on a separate, removable component, for example, to facilitate replacement of a worn or damaged valve seat. In the illustrated embodiment, the valve seat 220 is provided on a seat carrier 221 that is sized to be installed in the valve cavity 215 and secured against a recessed surface 214 of the valve body 210 by a threaded nut or insert 216. The seat carrier 221 includes an outer rim portion 222 that is clamped between the insert 216 and the recessed surface 214, a central port 223 that aligns with the valve first flow passage 211, a seal ring 225 (which may be integrally formed with the valve seat 220) that surrounds the central port 223 and seals against the recessed surface, and one or more peripheral ports 224 that permit flow between the central port and the second flow passage 212 when the diaphragm 230 is in the open position, spaced apart from the valve seat 220. The outer perimeter 231 of the diaphragm 230 may be welded to the seat carrier 221 or clamped between the insert 214 and the seat carrier. Similar arrangements are described in co-owned U.S. Pat. No. 9,863,542, the entire disclosure of which is incorporated herein by reference.

The exemplary actuator 240 includes an actuator housing 250 assembled with the valve body 210 (e.g., by threaded engagement with the insert 216, as shown), and an actuating arrangement 260 axially movable within the actuator housing between a first position holding the diaphragm 230 in the closed position and a second position permitting movement of the diaphragm from the closed position to the open position. The exemplary actuating arrangement 260 includes an actuator stem 270 extending through a lower bore 251 in the actuator housing, an actuator button 280 disposed between a lower end of the actuator stem and the diaphragm 230 for contact with the central portion 232 of the diaphragm, and a bearing member 290 disposed between the actuator stem and the actuator button, as described in greater detail below.

In the illustrated embodiment, the actuator 240 is a pneumatic actuator in which pressurized gas (provided to an inlet port 252 of the actuator housing 250) forces one or more actuator pistons 275 (which may be integrally formed with the actuator stem 270, as shown) axially within an internal chamber 253 of the actuator housing 250 to move the actuator stem 270 from a first position (e.g., holding the diaphragm in a closed position) to a second position (e.g., permitting movement of the diaphragm to an open position). One or more springs 255 may be provided in the actuator housing chamber 253 to return the actuator stem 270 and piston(s) 275 to the first position upon removal/venting of the pressurized gas. O-rings 256, 257, 258 may be provided with the actuator stem 270 for fluid-tight sealing with the actuator housing 250, and one or more bushings 259 may be provided with the actuator stem to maintain axial alignment of the actuator stem within the actuator (e.g., to minimize side loading). Other actuator designs and configurations may be used as appropriate.

The actuator button 280 may include a diaphragm engaging surface 281 sized and contoured to press the flexible central portion 232 of the diaphragm 230 against the valve seat 220. To allow for a larger surface contact area, improved manufacturability, and positional adjustment of the diaphragm engaging surface (e.g., to account for small misalignments and/or machining tolerances), the actuator button 280 may be loosely assembled or loosely retained with the actuator stem 270, as shown, by assembly of the actuator housing 250 with the valve body 210 loosely holding the actuator stem and actuator button together. While many different loose assembly configurations may be utilized, in the illustrated embodiment, the actuator button 280 includes an upper annular wall portion 282 defining an upper socket portion 283 into which a lower end portion 271 of the actuator stem 270 is loosely received. The upper annular wall portion 282 of the actuator button 280 is received in an annular recess between the lower bore 251 of the actuator housing and the lower end portion 271 of the actuator stem 270.

In the illustrated embodiment, the bearing member 290 is disposed between the actuator stem 270 and the actuator button 280, with an upper portion 291 of the bearing member being received in a lower socket portion 273 of the actuator stem 270 (e.g., defined by a lower annular wall portion 272 of the actuator stem), and at least a lower portion 292 of the bearing member being received in the upper socket portion 283 of the actuator button 280. While the upper portion 291 of the bearing member 290 may be loosely received in the actuator stem lower socket portion 273, in the illustrated embodiment, the bearing member is secured with the lower socket portion for retention with the actuator stem 270 (e.g., when the actuator stem is disassembled from that actuator). For example, the bearing member 290 may be press fit into the actuator stem lower socket portion 273. In such an arrangement, the lower annular wall portion 272 of the actuator stem 270 may have a wall thickness and/or elasticity that allows for press fit or interference fit insertion of the bearing member 290 into the actuator stem lower socket portion 273. As another example, the lower annular wall portion 272 of the actuator stem 270 may loosely receive the bearing member 290, and then subsequently be crimped or staked inward over and/or against the bearing member to secure the bearing member with the actuator stem. As still another example, the lower annular wall portion 272 of the actuator stem 270 may include a radially inward protruding lip, flange or undercut 276 configured to flex radially outward when the bearing member is pressed against the annular wall portion 272, and then snap radially inward over the bearing member 290 for snap-fit retention of the bearing member with the actuator stem. The annular wall portion may be notched or segmented to facilitate this elastic snap-fit engagement with the bearing member.

Figure 3B:
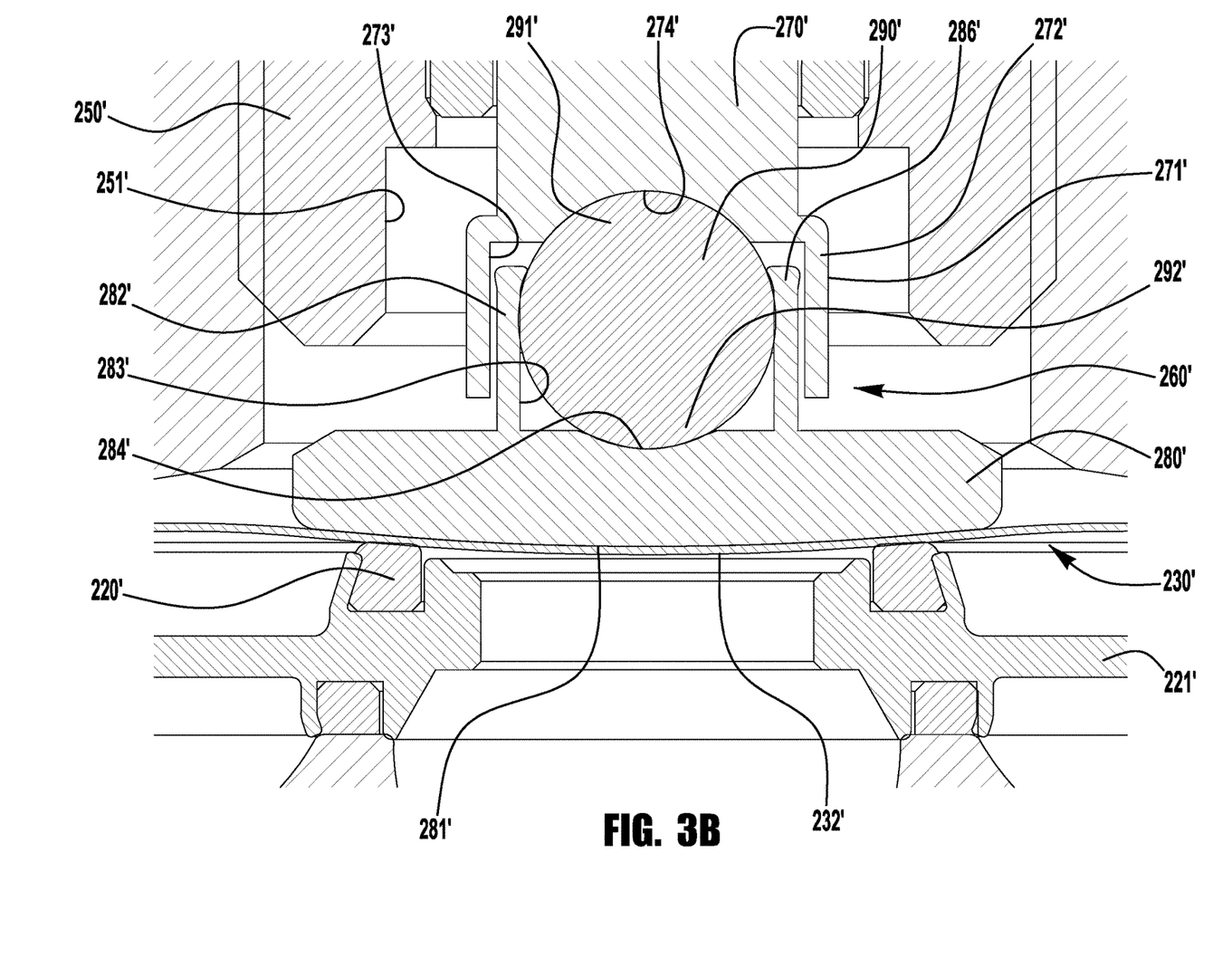
FIG. 3B is an enlarged partial cross-sectional view of an alternative actuating arrangement for a diaphragm valve assembly, according to another exemplary embodiment of the present disclosure.
Figure 4:
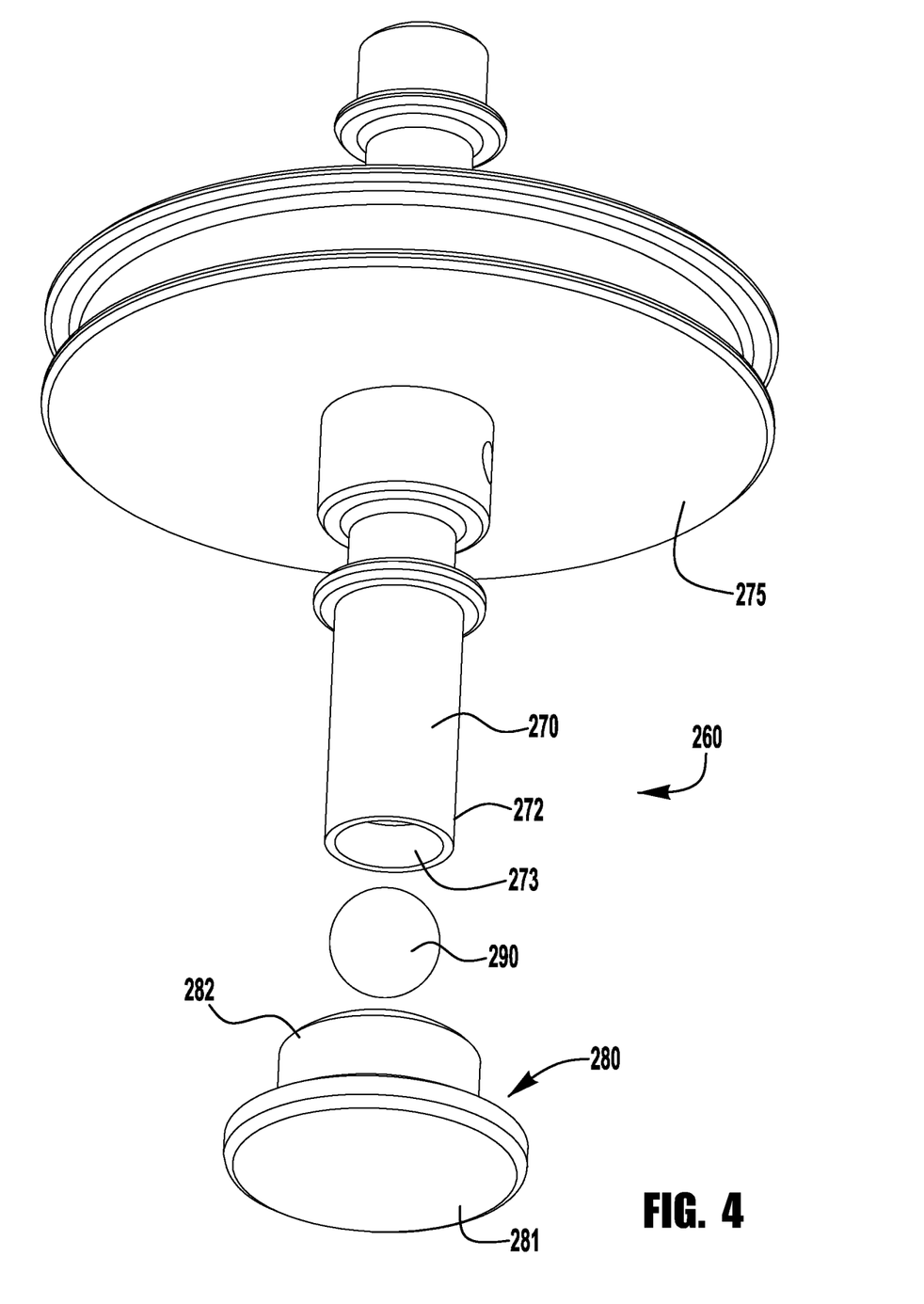
FIG. 4 is an exploded perspective view of the actuating arrangement of the diaphragm valve assembly of FIG. 2.
Figure 5:
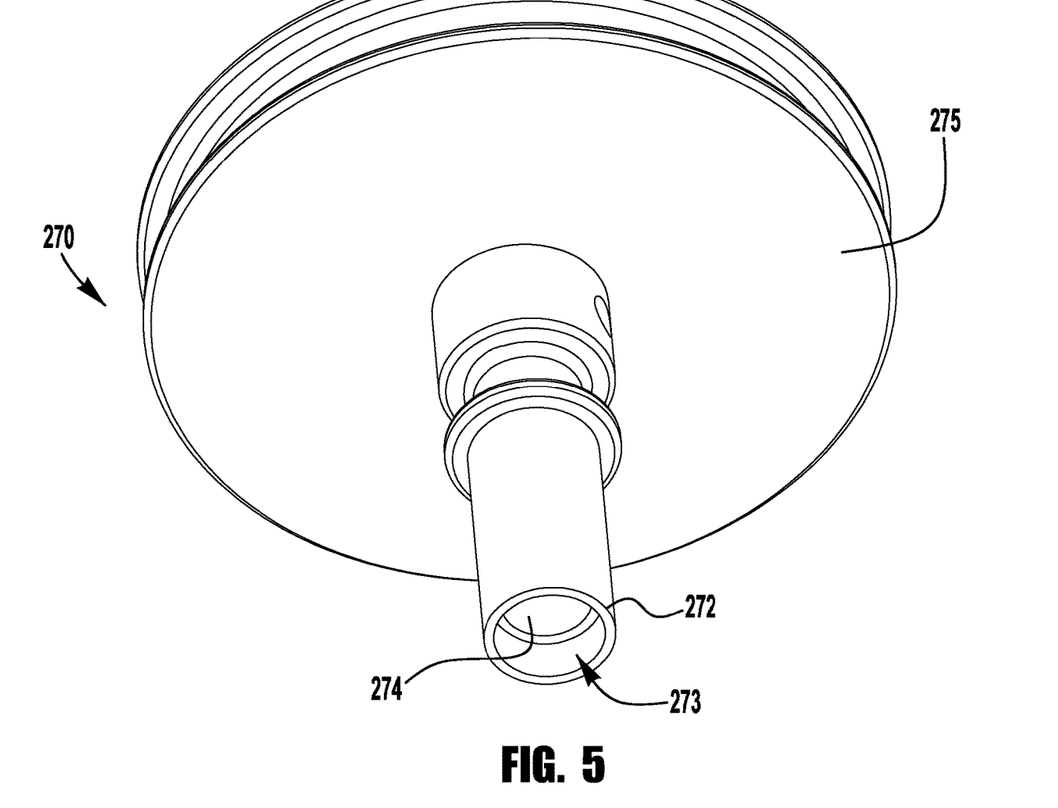
FIG. 5 is a lower perspective view of the actuator stem of the diaphragm valve assembly of FIG. 2.
Figure 6:
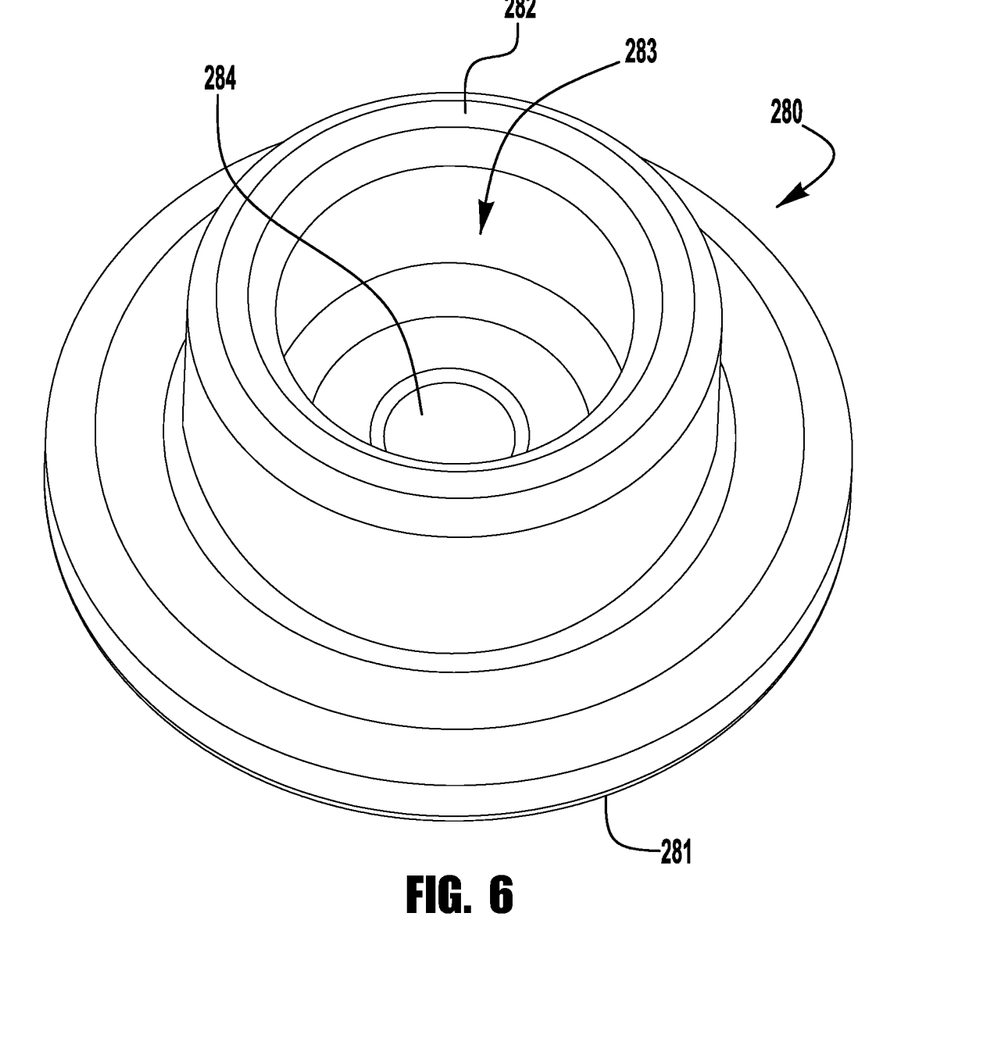
FIG. 6 is an upper perspective view of the actuator button of the diaphragm valve assembly of FIG. 2.

In other embodiments, the bearing member may be retained or secured within an upper socket portion of the actuator button. FIG. 3B illustrates another exemplary embodiment of an actuating arrangement 260', similar to the actuating arrangement 260 of FIG. 3A (and numbered accordingly), but with the bearing member 290' secured with an upper socket portion 283' of an actuator button 280'. The exemplary actuating arrangement 260' includes an actuator stem 270' extending through a lower bore 251' in the actuator housing, an actuator button 280' disposed between a lower end of the actuator stem and the diaphragm 230' for contact with the central portion 232' of the diaphragm, and a bearing member 290' disposed between the actuator stem and the actuator button. The actuator button 280' may be loosely assembled or loosely retained with the actuator stem 270', as shown, by assembly of the actuator housing 250' with the valve body loosely holding the actuator stem and actuator button together. While many different loose assembly configurations may be utilized, in the illustrated embodiment, the actuator stem 270' includes a lower end portion 271' having an annular wall portion 272' into which an upper annular wall portion 282' of the actuator button 280' is loosely received.

In the illustrated embodiment, the bearing member 290' is disposed between the actuator stem 270' and the actuator button 280', with at least an upper portion 291' of the bearing member being received in a lower socket portion 273' of the actuator stem 270' (e.g., defined by the lower annular wall portion 272'), and a lower portion 292' of the bearing member being received in the upper socket portion 283' of the actuator button 280'. In the illustrated embodiment, the bearing member 290' is secured with the upper socket portion 283' for retention with the actuator button 280' (e.g., when the actuator stem is disassembled from that actuator). For example, the bearing member 290' may be press fit into the actuator button upper socket portion 283'. In such an arrangement, the upper annular wall portion 282' of the actuator stem 280' may have a wall thickness and/or elasticity that allows for press fit or interference fit insertion of the bearing member 290' into the actuator button upper socket portion 283'. As another example, the upper annular wall portion 282' of the actuator button 280' may loosely receive the bearing member 290', and then subsequently be crimped or staked inward over and/or against the bearing member to secure the bearing member with the actuator button. As still another example, the upper annular wall portion 282' of the actuator button 280' may include a radially inward protruding lip, flange or undercut 286' configured to flex radially outward when the bearing member is pressed against the annular wall portion 282', and then snap radially inward over the bearing member 290' for snap-fit retention of the bearing member with the actuator button. The annular wall portion may be notched or segmented to facilitate this elastic snap-fit engagement with the bearing member.

The bearing member can be provided in a variety of shapes. In some embodiments, the bearing member may include a convex upper portion, for example, for increased surface seating engagement with a concave inner face portion of the actuator stem lower socket portion, and/or a convex lower portion, for example, for increased surface seating engagement with a concave inner face portion of the actuator button upper socket portion. The increased surface contact between the bearing member and the actuator stem and button components may, for example, provide for reduced contact stress between these components, thereby reducing component wear due to valve cycling. The convex-concave seating engagement between the bearing member and the actuator button may additionally facilitate angular adjustment of the actuator button on the actuator stem, with the actuator button and convex bearing functioning similar to a ball and socket joint. This may allow the actuator button to properly align with the diaphragm and valve seat for optimum valve shut-off performance (e.g., to account for small misalignments and/or machining tolerances in the valve seat and actuator components).

In the illustrated embodiments, the bearing member 290, 290' is spherical, thereby providing convex upper and lower portions 291, 292, 291', 292' in any installed orientation. The lower socket portion 273, 273' of the actuator stem 270, 270' includes a concave inner face portion 274, 274' providing increased surface seating engagement with the bearing member upper portion 291, 291', and the upper socket portion 283, 283' of the actuator button 280, 280' includes a concave inner face portion 284, 284' providing increased surface seating engagement with the bearing member lower portion 292, 292'. The bearing member may alternatively be, for example, cylindrical, barrel-shaped, ovoid, ellipsoid, or any other suitable shape which may, but need not, have convex upper and/or lower portions. The actuator button 280 may be manufactured from powdered metal, which may allow for the formation of an appropriately sized and contoured concave inner face portion 284. The powdered metal material may additionally or alternatively provide a surface topology that allows for lubrication retention, for example, for reduced wear between the bearing member and the actuator button.

In some applications, the bearing member is provided in a material having an increased hardness relative to the material(s) of the actuator stem and actuator button, for example, for reduced wear, increased dimensional stability, and elimination of galling of the actuator components. Additionally or alternatively, the bearing member may be provided in a material having a reduced thermal conductivity, for example, to provide a thermal break between the upper actuator components and the actuator button, valve diaphragm, and valve seat, providing improved thermal stability for the valve assembly. In an exemplary embodiment, the actuator stem and actuator button are metal components (e.g., stainless steel), and the bearing member is a ceramic component. In other embodiments, the bearing member may be formed from a harder metal material than the actuator stem and button components, for example, a hardened stainless steel material, such as, for example 440C stainless steel.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:
1. A diaphragm valve comprising:
 a valve body defining a flow passage extending to an internal valve cavity;
 a valve seat disposed in the valve cavity and surrounding the flow passage;
 a diaphragm disposed in the valve cavity, the diaphragm including an axially fixed outer periphery and an axially flexible central portion movable between a closed position in sealing engagement with the valve seat and an open position axially spaced apart from the valve seat; and
 an actuator including an actuator housing assembled with the valve body and an actuating arrangement axially movable within the actuator housing between a first position holding the diaphragm in the closed position and a second position permitting movement of the diaphragm from the closed position to the open position, wherein the actuating arrangement comprises:

an actuator stem extending through a lower bore in the actuator housing;

an actuator button disposed between a lower end of the actuator stem and the diaphragm for contact with the diaphragm; and a bearing member disposed between the actuator stem and the actuator button, wherein an upper portion of the bearing member is received in a lower socket portion of the actuator stem, and a lower portion of the bearing member is received in an upper socket portion of the actuator button;

wherein the upper socket portion of the actuator button includes an annular wall, and wherein the lower bore of the actuator housing and the lower socket portion of the actuator stem define an annular recess receiving the annular wall of the upper socket portion.

2. The diaphragm valve of claim 1, wherein the bearing member is secured with the lower socket portion of the actuator stem.

3. The diaphragm valve of claim 2, wherein the bearing member is press fit into the lower socket portion.

4. The diaphragm valve of claim 2, wherein the lower socket portion is crimped over the bearing member.

5. The diaphragm valve of claim 2, wherein the lower socket portion is snap-fit over the bearing member.

6. The diaphragm valve of claim 1, wherein the bearing member includes a convex upper portion.

7. The diaphragm valve of claim 6, wherein the lower socket portion of the actuator stem includes a concave inner face portion providing increased surface contact with the convex upper portion of the bearing member.

8. The diaphragm valve of claim 1, wherein the bearing member includes a convex lower portion.

9. The diaphragm valve of claim 8, wherein the upper socket portion of the actuator button includes a concave inner face portion providing increased surface contact with the convex lower portion of the bearing member.

10. The diaphragm valve claim 1, wherein the bearing member is spherical.

11. The diaphragm valve of claim 1, wherein the bearing member includes a material having a greater hardness than a material of the actuator stem and a material of the actuator button.

12. The diaphragm valve of claim 1, wherein the bearing member includes a material having a lower thermal conductivity than a material of the actuator stem and a material of the actuator button.

13. The diaphragm valve of claim 1, wherein the bearing member includes ceramic.

14. The diaphragm valve of claim 1, wherein the actuator stem and actuator button include metal.

15. The diaphragm valve of claim 1, wherein the actuator button is manufactured from powdered metal.

16. The diaphragm valve of claim 1, wherein the actuator stem includes a fluid driven piston.

17. The diaphragm valve of claim 1, wherein the actuator button is loosely retained with the actuator stem and the bearing member by assembly of the valve body with the actuator housing.

18. The diaphragm valve of claim 1, wherein the actuator button is angularly movable with respect to the actuator stem.

19. The diaphragm valve of claim 1, wherein the annular wall is a first annular wall, and the lower socket portion of the actuator stem includes a second annular wall, wherein the lower bore of the actuator housing and the second annular wall define the annular recess.

20. A diaphragm valve comprising:

a valve body defining a flow passage extending to an internal valve cavity;

a valve seat disposed in the valve cavity and surrounding the flow passage;

a diaphragm disposed in the valve cavity, the diaphragm including an axially fixed outer periphery and an axially flexible central portion movable between a closed position in sealing engagement with the valve seat and an open position axially spaced apart from the valve seat; and an actuator including an actuator housing assembled with the valve body and an actuating arrangement axially movable within the actuator housing between a first position holding the diaphragm in the closed position and a second position permitting movement of the diaphragm from the closed position to the open position, wherein the actuating arrangement comprises:

an actuator stem extending through a lower bore in the actuator housing;

an actuator button disposed between a lower end of the actuator stem and the diaphragm for contact with the diaphragm; and a bearing member disposed between the actuator stem and the actuator button, wherein an upper portion of the bearing member is received in a lower socket portion defined by an annular wall of the actuator stem, and a lower portion of the bearing member is received in an upper socket portion defined by an annular wall of the actuator button;

wherein one of the upper socket portion and the lower socket portion includes a concave inner face portion, with the bearing member press fit into the one of the upper socket portion and the lower socket portion, and the concave inner face portion providing increased surface contact with a convex portion of the bearing member.

21. The diaphragm valve of claim 20, wherein the one of the upper socket portion and the lower socket portion is the upper socket portion.

22. The diaphragm valve of claim 20, wherein the one of the upper socket portion and the lower socket portion is the lower socket portion.

23. The diaphragm valve of claim 20, wherein the convex portion of the bearing member is a first convex portion, wherein the other of the upper socket portion and the lower socket portion includes a concave inner face portion providing increased surface contact with a second convex portion of the bearing member.

24. The diaphragm valve of claim 20, wherein the annular wall of the actuator button surrounds the annular wall of the actuator stem.

25. The diaphragm valve of claim 20, wherein the lower socket portion of the actuator stem is received in the upper socket portion of the actuator button.

26. The diaphragm valve of claim 20, wherein the actuator button is loosely retained with the actuator stem and the bearing member by assembly of the valve body with the actuator housing.

* * * * *